(12) United States Patent
Bar-Tal et al.

(10) Patent No.: US 9,321,286 B2
(45) Date of Patent: Apr. 26, 2016

(54) METHOD AND SYSTEM FOR SECTIONING ARTWORK FROM MEDIUM

(71) Applicants: Yaron Bar-Tal, Ganey Tikva (IL); Avi Zahavi, Hod Hasharon (IL); Erez Zimerman, Nes Ziona (IL); Hanan Yosefi, Ganey Tikva (IL); Ori Avivi, Nes Ziona (IL)

(72) Inventors: Yaron Bar-Tal, Ganey Tikva (IL); Avi Zahavi, Hod Hasharon (IL); Erez Zimerman, Nes Ziona (IL); Hanan Yosefi, Ganey Tikva (IL); Ori Avivi, Nes Ziona (IL)

(*) Notice: Subject to any disclaimer, the term of this patent is extended or adjusted under 35 U.S.C. 154(b) by 0 days.

(21) Appl. No.: 14/054,296

(22) Filed: Oct. 15, 2013

(65) Prior Publication Data

US 2014/0104358 A1   Apr. 17, 2014

(30) Foreign Application Priority Data

Oct. 14, 2012   (IL) .......................................... 222907

(51) Int. Cl.
| | |
|---|---|
| B41J 2/01 | (2006.01) |
| B41J 11/66 | (2006.01) |
| G06K 15/16 | (2006.01) |
| B41J 11/68 | (2006.01) |
| B41J 11/70 | (2006.01) |
| B26D 5/00 | (2006.01) |

(52) U.S. Cl.
CPC ................. *B41J 11/663* (2013.01); *B26D 5/00* (2013.01); *B41J 11/666* (2013.01); *B41J 11/68* (2013.01); *B41J 11/706* (2013.01); *G06K 15/16* (2013.01)

(58) Field of Classification Search
CPC ...... B41J 11/007; B41J 11/06; B41J 11/0085; B41J 13/103; B41J 11/0065
USPC .................................................. 347/104, 101
See application file for complete search history.

(56) References Cited

U.S. PATENT DOCUMENTS

| | | | | | |
|---|---|---|---|---|---|
| 1,980,400 | A | * | 11/1934 | Grupe ............................. | 270/41 |
| 3,419,447 | A | * | 12/1968 | Hewitt .......................... | 156/73.3 |
| 4,874,161 | A | * | 10/1989 | Murasaki ............... | B65H 43/00 |
| | | | | | 271/265.01 |
| 5,303,624 | A | * | 4/1994 | Ventham et al. ................ | 83/202 |
| 5,992,973 | A | * | 11/1999 | Wen ..................... | B41J 11/0065 |
| | | | | | 347/19 |
| 2001/0054790 | A1 | * | 12/2001 | Ikeda ........................... | 271/213 |
| 2003/0038990 | A1 | * | 2/2003 | Liberman ............. | B41J 11/001 |
| | | | | | 358/493 |
| 2006/0005722 | A1 | * | 1/2006 | Nobukawa et al. .......... | 101/181 |
| 2009/0025123 | A1 | * | 1/2009 | Weedlun et al. .................. | 2/244 |
| 2010/0083476 | A1 | * | 4/2010 | Brusa .......................... | 29/283.5 |
| 2011/0148961 | A1 | * | 6/2011 | Arakawa et al. .................. | 347/9 |
| 2011/0205277 | A1 | * | 8/2011 | Hiroike .................... | B41J 11/42 |
| | | | | | 347/16 |
| 2012/0062927 | A1 | * | 3/2012 | Tsuji ........................... | 358/1.13 |

\* cited by examiner

*Primary Examiner* — Manish S Shah
*Assistant Examiner* — Yaovi Ameh
(74) *Attorney, Agent, or Firm* — Robert G. Lev

(57) ABSTRACT

A digital printing machine for printing onto a medium, the digital printing machine comprising a chassis, a digital print means, an advancing mechanism for advancing the medium; the machine further comprising a widthwise cutter coupled to the chassis, wherein the digital print means and the widthwise cutter are controlled by a common computer controller, thereby ensuring that the cutting of the cutter is in registration with printing by said digital print means.

26 Claims, 5 Drawing Sheets

METHOD AND SYSTEM FOR SECTIONING ARTWORK FROM MEDIUM

FIELD OF THE INVENTION

The present invention relates to methods and systems for sectioning media, typically but not exclusively for cutting out smaller printed images and artwork printed on larger sheets such as when using wide format inkjet printers.

BACKGROUND OF THE INVENTION

Digital printing refers to methods of printing from a digital based image directly to a variety of media. It usually refers to professional printing where small run jobs from desktop publishing and other digital sources are printed using large format and/or high volume laser or inkjet printers. Digital printing has a higher cost per page than more traditional offset printing methods but there is generally a cost saving in preparing for printing in terms of time and materials.

Digital printing also allows for on demand printing, short turn around, and modification of the image with each impression.

There are a number of printers that print onto precut media of final desired size. Office desk top printers which generally accept A4 sheets are examples of this. With such small sheets of media, the image is generally fairly well aligned with the edges of medium.

Wide format printers are required for printing wide products, such as signs and posters, for example. A wide format printer can, however, also be used for printing smaller artwork such as posters and the like.

Wide format printers accept large media, as roll stock or sheets, and may be configured to print a number of print jobs on the media across its width and on part of the roll.

After printing, the media is sectioned to separate the individual printed areas, which may be different artwork for possibly different projects, perhaps even for different clients.

A number of similar or different pieces of artwork, that may be part of the same or different print jobs, possibly for different clients, may be arranged across the width of the media to minimize media wastage. After printing, the printed section of the media may be cut off the remaining roll of media, and the individual pieces of artwork may be cut to size.

In digital printing, the images are not necessarily aligned with the edges of the medium. This is particularly the case with wide format and super wide format printing and where the medium is flexible and large.

To section the medium, cutters must therefore be carefully aligned with respect to the artwork itself or with registration marks. This has traditionally been achieved manually after removing the print job from the printing machine.

The vast majority of applications for printed matter on flexible media such as paper are rectangular. To separate from the media, after printing, cuts are required parallel and perpendicular to the printed artwork. Registration marks are often printed together with the image of interest, and then on a separate machine or simple cutting table, cutters, such as scissors, knives or guillotine blades, cut the media using the registration marks for alignment purposes.

The cutting may be positioned to follow the edge of the printed area, along the edge, or a margin may be left, or the cutting may be configured to follow the edge within the edge, to remove the outermost, known as the bleed.

In all cases, whether the edge of the image is used for registration or separate registration marks are printed, careful alignment is required to ensure that the media is cut properly.

Typically, a simple cutting table is used for cutting. The printed media is removed from the printing machine and taken to the cutting table and then the cutters are aligned using registration marks or the edge of the printed area, either manually or automatically. Alignment of cutters with the images, even where registration marks are used for so doing, is time-consuming, reduces throughput and increases the total system cost. Even in the case of a digital cutter attached to the printer, such a cutter operates only according to registration marks and manual adjustment by the user and there is no automation and control by the printer itself based on the actual data printed.

Manual cutting is subject to a high level of human error, resulting in wastage.

With small objects, such as book pages that are A4 or A5, but even larger objects that are up to and including, say A2 or A1 size pages, a small deviation is not noticeable. When printing across the width of a wide format printer having a width of 1 to 5 meters, a very small angular misalignment becomes magnified as one moves across the media.

U.S. Pat. No. 6,874,418 to Ullrich et al. titled "Cutting device for cutting a printing material in the printing unit of a printing device" describes an electrographic printing devices, for printing media such as paper webs, which addresses the problem of a malfunction requiring that the printing material has to be removed from the printing unit the drive rollers for the printing material becoming dirtied by non-fixed toner images. A cutting device is provided that presents a reel cutter that is guided in a guide groove of a guide tube. When a malfunction occurs, the cutting device is activated, the reel cutter cuts the printing material, and the cut sections of the printing material are pulled out of the printing unit separately. Thus U.S. Pat. No. 6,874,418 to Ullrich et al describes a cutter on a track coupled to the same chassis as the track of the print head, that is designed for separating a jammed medium. It will be appreciated that the medium will invariably be tugged erratically from the print table and the cuts will not be in parallel to the printing. Furthermore, the cutter may even be upstream of the printing. It will therefore be appreciated that Ullrich does not provide or anticipate a solution to the problem of aligning cutters with printed images.

SUMMARY OF THE INVENTION

A first aspect of embodiments of the invention is directed to a digital printing machine for digital printing onto a flexible medium. The digital printing machine comprising a chassis, a processor controlling a digital print means and an advancing mechanism for advancing the medium; the printing machine further comprising a widthwise cutter coupled to the chassis that is under control of the said processor, for making cuts that are in registration with artwork printed by said digital print means.

The digital print means may include thermal transfer printers, Xerography printers, laser printers with dry toner, and/or inkjet printers.

The digital print means may be a one color printing means, such as a black printer, or a black printer with an additional spot color, or may be a multi color printer, such as cmyk. Additional light colors such as light cyan, or spot colors such as a specific Pantone or other designated color such as Coca Cola Red or a combination of all of the above.

In some embodiments, the inkjet printer head carriage is configured to scan across the medium along a track and the widthwise cutter is configured to make cuts at a fixed known distance in front of the track scanned by the inkjet print head.

In some embodiments, the inkjet printer head arrangement is provided on a carriage configured to reciprocate across the width of the printer chassis.

One embodiment is directed to providing a printing machine for printing onto a medium, the printing machine comprising a chassis, an advancing mechanism and an inkjet printer head arrangement on a carriage, the carriage configured to reciprocate across the width of the printer chassis, and the advancing mechanism for advancing the medium between reciprocations of the carriage; the machine further comprising a widthwise cutter coupled to the chassis for making cuts that are parallel to and at a fixed known distance from the track followed by the inkjet printer carriage thereby ensuring that the cutting of the cutter is in registration with printing by said print head arrangement.

In some embodiments, the printing machine further comprises a computer controller wherein said inkjet printer head arrangement and said width cutter are computer controlled by said computer controller, such that said cutter is automatically configurable to cut across the medium at a predetermined distance from an edge of an image.

The widthwise cutter may be selectively configurable to cut through said medium to either (a) leave a preset margin around the printed area, (b) to follow the edge of the printed area, or (c) to remove bleed at edge of printed area.

The widthwise cutter may be set to optically follow registration marks across the medium.

Typically the widthwise cutter comprises a cutting tool is selected from the group comprising a blade and a pair of blades configured as a scissors arrangement and a guillotine blade.

In some embodiments, the widthwise cutter comprises two cutting tools, one configured to cut as the widthwise cutter is moved from left to right and the other configured to cut as the widthwise cutter is moved from right to left.

In some embodiments, the printing machine further comprises at least one lengthwise cutter configured to cut the medium perpendicularly to the track followed by the widthwise cutter.

Typically, the lengthwise cutter is selected from the group comprising a blade and a pair of blades configured as a scissors arrangement and a guillotine blade.

Alternatively, the lengthwise cutter may be a laser.

In some embodiments, the lengthwise cutter is set to follow registration marks.

In some embodiments, the lengthwise cutters are manually positionable.

In some embodiments, the lengthwise cutters are positionable by an automated positioning arrangement controlled by the computer controller.

In some embodiments, the lengthwise cutter can be moved dynamically whilst the media is advanced to create a non perpendicular cut.

The printing machine may be a wide format inkjet printing machine wherein the printhead carriage reciprocates over a distance of at least one meter for printing media that is at least one meter wide.

The printing machine may be a wide format inkjet printing machine wherein the print head carriage reciprocates over a distance of at least three meters.

The printing machine may be a wide format inkjet printing machine wherein the print head carriage reciprocates over a distance of five meters.

The printing machine typically has a smaller footprint than a printer and separate cutter unit downstream thereof.

Preferably the medium is kept taut between the printer head track and widthwise cutter track.

Preferably the widthwise cutter reciprocates along a track at a fixed distance with respect to the track followed by the print head arrangement.

In preferred embodiments, both widthwise and lengthwise cutters are automatically controlled to provide finished rectangular cut products, using the actual printed image to set the rectangular borders.

In some embodiments, the widthwise cutters are automatically configured in accordance with artwork position on the media.

In some embodiments, the lengthwise cutters are automatically configured in accordance with artwork position on the media.

The actual cutting may be dependent on the print mode, so the actual printed pass length is taken into account in controlling cutters for precise inline cutting where different print modes have different print pass lengths.

In preferred embodiments, in addition to being able to make full width widthwise cuts, the widthwise cutters may be configured to make partial cuts from at least one edge, and preferably from each edge of the media, to cut across only part of the width of the media to enable separation of specific artwork images from the media.

A second aspect of the invention is directed to a method of producing individual separate printed items comprising: (a) planning an array of the individual items on a medium in a wide format printing machine; (b) printing artwork of said individual items in the array across the media with the digital printing means, and (c) cutting said media to separate said individual items with cutters, wherein said cutters are in alignment with said digital printing means and both the cutters and the digital printing means are controlled by the same computer controller so edges of said printed items are correctly aligned with the artwork.

A third aspect of the invention is directed to a method of producing individual separate printed items comprising: (i) providing a printing machine comprising a digital printing means, cutters and a computer controller, wherein said cutters follow a known path with respect to the digital printing means, and providing the computer controller with: (ii) a first set of instructions for planning an array of said individual items on a medium in a wide format printing machine; (iii) a second set of instructions for printing artwork of said individual items in the array across the media with the digital printing means, and (iv) cutting said media to separate said individual items with cutters, such that edges of said printed items are correctly positioned with respect to the artwork.

The term computer controller as used herein, is a general term for a computer that receives image data and controls the printing and cutting of the printing machine. There are many ways to implement this, and the controller will typically include a processor chip or a number of processor chips in communication with each other, under appropriate software.

BRIEF DESCRIPTION OF FIGURES

For a better understanding of the invention and to show how it may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice.

In the accompanying drawings.

BRIEF DESCRIPTION OF EMBODIMENTS

Computer controlled inkjet printers are able to print using a carriage that carries a number of different inkjet heads, such that the jets remain in mutual alignment and registration for each of the printed colors and also between the various printed colors to ensure color to color registration as well.

A wide or super wide format printer is required to print large images which may be a tone image across the entire width of the media or a mosaic of smaller images arranged to fill the width of the media. After printing, the printed medium may be taken to a separate cutting table where cutters are used to separate the images from the larger sheet of media.

The following description relates to an inkjet printer. The inkjet printer may be a one pass or multi-pass printer that may print on scanning in one direction or both directions. The images printed may be monochrome, or multicolor, and may use any number of colors such as three color printing, four color printing, spot printing of additional colors and other combinations.

In addition to inkjet printers, the present invention is applicable to other types of digital printers, including but not limited to thermal transfer printers, laser printers with dry toner, xerography printers.

Figure 1:
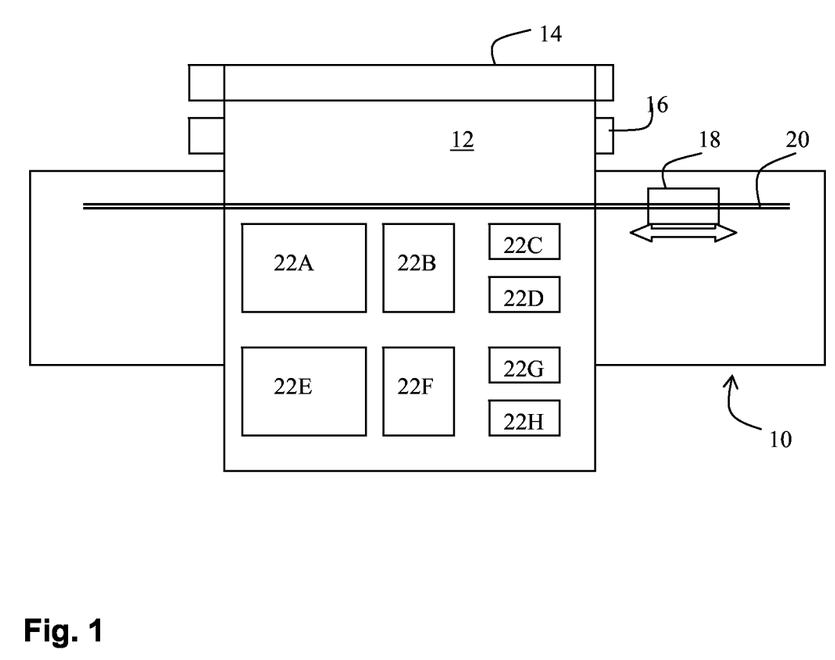
FIG. 1 is a schematic plan view of a wide format inkjet printer of the prior art.

With reference to FIG. 1, a schematic top view illustration of a wide format printer machine 10 is shown. A medium 12 is forwarded into the printer machine 10. The medium may be provided as roll-stock on a roll 14 or may be provided in sheet form.

The feed mechanism typically includes one or more rollers 16 that push or pull the medium through the printer machine 10.

A carriage 18 carrying the ink jet print heads (not shown) reciprocates along a track 20 across the width of the printer machine 10 and the medium 12 is forwarded slightly between each side to side printing cycle of the carriage 18 and inkjet print heads which may be configured to print in one direction such as where the carriage 18 moves to the left, or in both directions, i.e. as the carriage moves from left to right and from right to left across the printer machine 10.

It will be appreciated that where a large sheet or medium 12 is printed with several smaller images, or where separate images 22A-H are printed on a roll, it is necessary to cut the medium 12 after printing.

In the past, cutting was performed on a separate machine. It was necessary to carefully align the cutters with the edges or margins of the printed images 22A-H. This is particularly the case with wide and super wide format printing, since it will be appreciated that a small angular misalignment of a degree or so, becomes magnified with increasing width of the media. Thus with respect to FIG. 5, a slight angle when cutting across a three meter or five meter sheet or roll of medium 134 may cause a cut apparently starting in correct proximity with an edge 136E of one image 122E at one side 124 of the medium 12 to be several millimeters away from the edge of the image 138G at the opposite side 128 of the medium 134.

Figure 2:
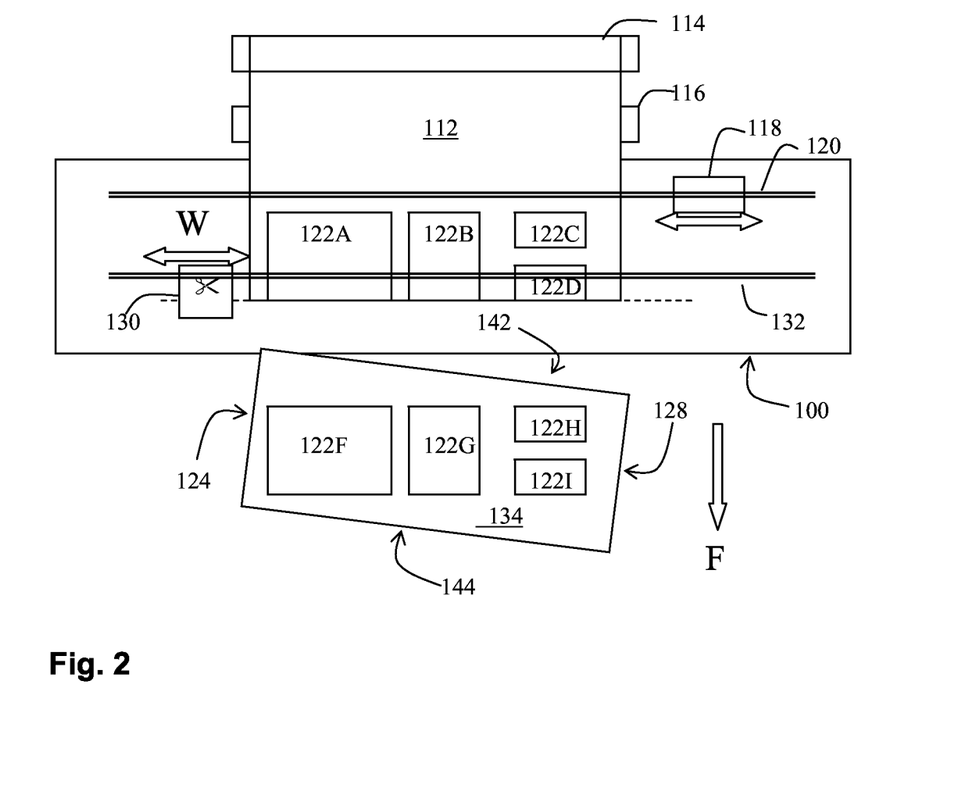
FIG. 2 is a schematic plan view of a wide format inkjet printing machine with integral widthwise cutter in accordance with one embodiment of the present invention.

With reference to FIG. 2, a schematic top view illustration of a wide format printer machine 100 in accordance with one embodiment is shown. A medium 112 is forwarded into the printer machine 100. The medium may be provided on a roll 114 as roll-stock or in sheet form. The feed mechanism typically includes one or more rollers 116 that push or pull the medium through the printer machine 100. A carriage 118 carrying the ink jet print heads (not shown) reciprocates along a track 120 across the width of the printer machine 100 and the medium 112 is forwarded slightly between each side to side printing cycle of the carriage 118 and inkjet print heads which may be configured to print in one direction such as where the carriage 118 moves to the left, or in both directions, i.e. as the carriage 112 moves from left to right and from right to left across the printer machine 100.

Unlike printer machine 10, the printer machine 100 of the invention further comprises a cutter 130 that reciprocates across a track 132 that is parallel to the track 120 followed by the carriage 118 carrying the printer heads.

In one embodiment, therefore, printed media may be automatically detached from a large sheet or more typically, a roll of media, with a cutter 130 that is integral to the printing machine 100.

In some embodiments, the detaching by the cutter 130 may use marks that are set in the design stage and are transferred through the Raster Image Processor RIP to the printer controller, automatically defining the cut position with respect to the artwork. This online digital information transfer from the various processes may automatically define the widthwise cut to be either inside, on the edge of or outside of the artwork, and exactly how wide the bleed/margins should be.

It will be noted that the cutter 130, the carriage 118 for the printer heads and the feed mechanism 116 are all rigidly connected to the chassis of the printer machine 100 and thus the image printed by the print heads is aligned (registered) with the print-track 120 followed by the print heads. Since the forwarding mechanism, typically a feed roller 116, is in fixed alignment with the track 120, it advances the medium 112 in a direction F perpendicular to the track 120, and the images printed 122A-122H though not aligned with the sides 124, 128 of the medium 112, are, nevertheless aligned with the chassis of the printer machine 100 in two perpendicular directions W, F.

The present invention is directed to providing a printing machine 100 that includes one or more widthwise cutters 130 and thus the printing machine 100 may both print desired images 122A-122I onto a medium 112 (134) and also section the medium 112 by cutting across the width of the medium 112, not perpendicular to the side edges 124, 128 of medium 112, but parallel to the edges of the images 122A, 122B, 122D, along the widthwise edges thereof, in effect, parallel with the track 120 followed by the carriage 118. The widthwise cutter(s) 130 may follow a track 132 across the medium 112 that is fixed to the chassis of the printer machine 100, and since the widthwise cutter(s) 130 follow a path in parallel with that followed by the carriage 118 carrying the inkjet printer heads, the widthwise cutter(s) 130 are always in perfect rotational alignment, i.e. perfectly square with the printed images 122.

Figure 5:
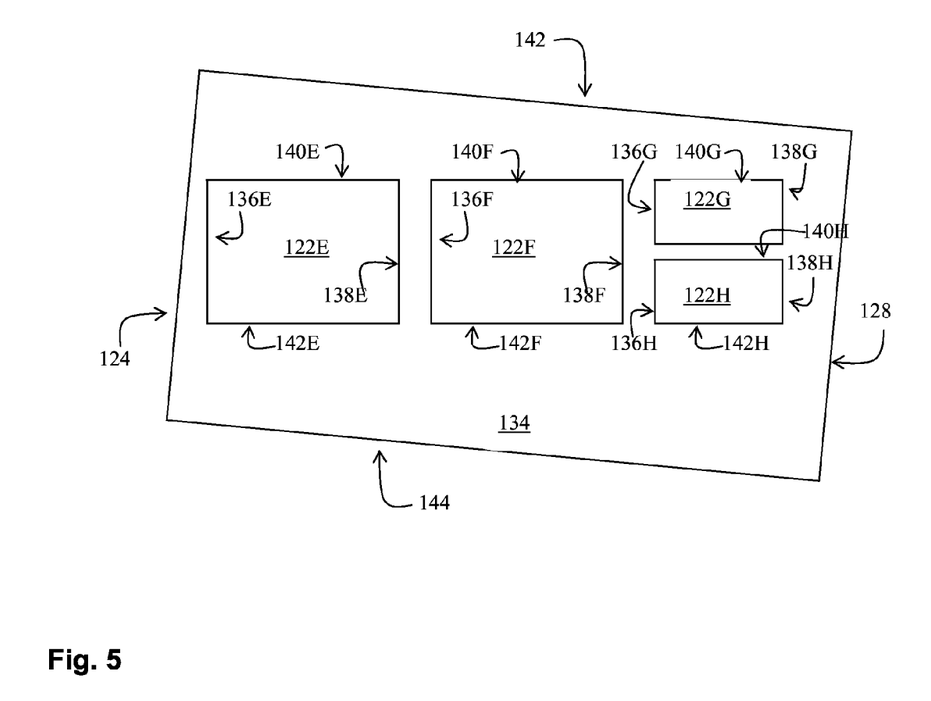
FIG. 5 is a larger illustration of a piece of medium with printed images thereon.

Minimally, this enables a straight cut to be made across the medium 112 that is parallel with the images 122 thereupon, enabling a section 134 to be detached, having parallel wide edges 124, 128 that are themselves parallel to the edges 136E-136H, 138E-138H of images 122E-122H printed thereupon, but not generally perfectly perpendicular to the original edges 124, 128 of the section 134.

By having both the printing head carriage 118 and the widthwise cutter(s) 130 moving in parallel along tracks 120, 132 that are fixed with respect to a common chassis, the line followed by the cutters 130 is in fixed alignment with printed images 122E-122H, and if the medium 112 is kept taut, the position of the widthwise cutter(s) 130 with respect to the edges 140E-140H of the printed images 122E, 122F, 122G may be set so no registration is required and the cutter will automatically follow the edges 140E, 140F, 140G of the printed images 122E, 122F, 122G.

In some embodiments, the detaching may use marks that are set in the design stage and are transferred through the Raster Image Processor RIP to the printer controller, automatically defining the cut position with respect to the artwork. This online digital information transfer from the various processes may automatically define the widthwise cut to be either inside, on the edge of or outside of the artwork, and exactly how wide the bleed/margins should be.

Other information related to the job requirements may also be transferred to the central processor and may define collating preferences such as to notify the user that a certain job is ready for collection or to switch collating trays for different size jobs or different customers etc.

The distance between the locus followed by the print-head in the carriage 118 reciprocating across the medium 112 and the path of the widthwise cutter 130 reciprocating across the medium 122 is known and fixed. This means that the widthwise cutter 130 may be automatically configured to cut exactly where required, whether this is exactly along the edge of a solid block of print, or leaving a small margin, or removing a bleed area.

Where cutting occurs right across the media 112, for sectioning a roll into sheets for example, scissors, i.e. a pair of blades surrounding the medium is preferred. These may be snipping scissors but preferably rotary scissors are used. For cutting out separate printed areas 122, as rectangular windows of media from a large sheet or roll 112 of media, a knife blade coming from one side is preferred. This may be a rotary cutter or a fixed blade. Other types of cutters, such as a heated wire or laser may also be used.

Once at least a main widthwise cut is performed by cutter 130, that is in alignment with the edges 140 of image(s) 122, it will be appreciated that the cut edge 144 (142) can be used to further section the cut medium, by subsequently aligning the cut edge 144 (142) with the side of a cutting table and performing perpendicular and parallel cuts therewith, either manually, semi-automatically or automatically as known. As a physical edge 144 (146) of the section 134 is used, alignment therewith is mechanical and much easier, faster and more accurate than using registration marks.

Thus in a first embodiment, a widthwise cutter 130 is provided that reciprocates along a track 132 parallel to the track 120 followed by the printing heads.

Preferably, a computer controller is provided that controls both the inkjet printer head arrangement and the widthwise cutter 130 such that the widthwise cutter 130 is automatically configurable to cut across the medium 112 at a predetermined distance from an edge of an image.

Figure 3:
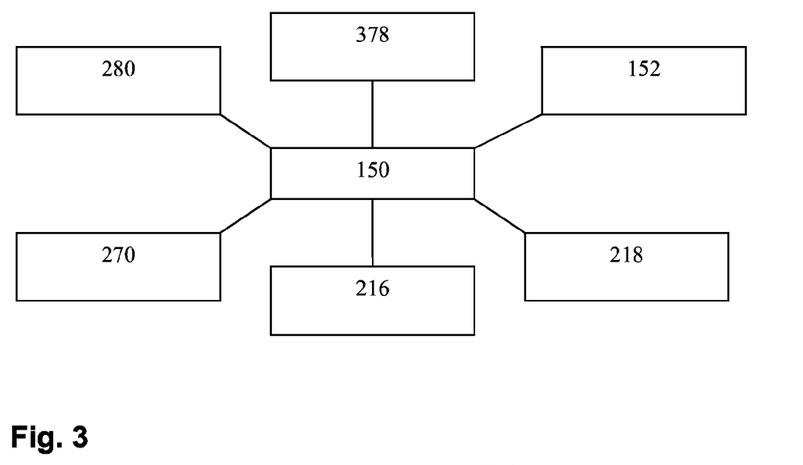
FIG. 3 is a schematic block diagram of the control system of one embodiment of the present invention.

With reference to FIG. 3, a schematic block diagram of a computer control system is shown. A common processor 150, or several processors/controllers in data communication with each other, typically a dedicated computer, operating under appropriate control software, controls the digital printing and the cutters. For example, where digital printer is an inkjet printer, the common processor 150 controls the ink supply to the inkjet head(s) 152 to jet the various colors of ink, and the position of the inkjet carriage 118 along the track 200 by an actuator, typically a servomotor 218. The common processor 150 also controls the advancing mechanism 216 for advancing the medium through the printing machine 100, typically for turning a forwarding roller 116. In contradistinction to the prior art, the common processor 150 also controls the actuator 230, such as a servomotor that moves the widthwise cutter 130 along the track 132.

The widthwise cutter 130 may be selectively configurable to cut through the medium 112 to either (a) leave a preset margin around the a printed area, (b) to follow the edge of the printed area, or (c) to remove bleed along the edge of the printed area.

The common processor 150 automatically registers the cutting with the artwork 122 making registration marks redundant. Thus although the widthwise cutter 130 may be set to optically follow registration marks across the medium 112, this is now redundant as the common processor 150 directly controls the printing and the cutting, ensuring mutual registration. This is particularly useful where textual signs and images with irregular shaped perimeters, such as cartoon characters and the like, are printed onto the medium 112 without background rectangles, but where, nevertheless, it is desirable to cut the medium 112 into rectangular sections 122A-H.

The widthwise cutter 130 may be any of a range of cutting tools such as a fixed or rotary blade, a pair of blades configured as a scissors arrangement, which may be snipper blades or a pair of round blades, or a guillotine blade, for example.

Generally, printing will result in the printhead carriage 118 reciprocating several times along its track 120 across the medium 112 between each widthwise sectioning cut 144, 146 by the widthwise cutter 130 being required. Depending on the printing mode, the printhead carriage 118 may print on moving in one direction only, or in both directions. It may reciprocate the whole width of the track 120, or only along part of it.

For fast cutting and for accurately trimmed edges, the widthwise cutter 130 may include two cutting tools, one configured to cut as the widthwise cutter 130 is moved from left to right and the other configured to cut as widthwise cutter 130 is moved from right to left. The two cutters may be the same. Alternatively, different cutters may be provided. For example, a single rotary blade may be provided for cutting towards the left and a scissors arrangement may be provided on the same track, for cutting towards the right (or viseversus). It will be appreciated that scissors arrangements are generally better where one cuts across the whole width of the medium 112, starting beyond one edge 124 of the medium 112, whereas single fixed or rotary blades are better for cutting a section from within the medium where the cut does not start at the edge 124, 128 of the medium. Where cutting different shaped products 122A-H arranged on a wide medium 112, it may be of interest to make a number of widthwise cuts 140E-H, 142E-H along only part of the medium 112, for example. In such applications, for example, a knife may be preferable to a scissors arrangement.

Figure 4:
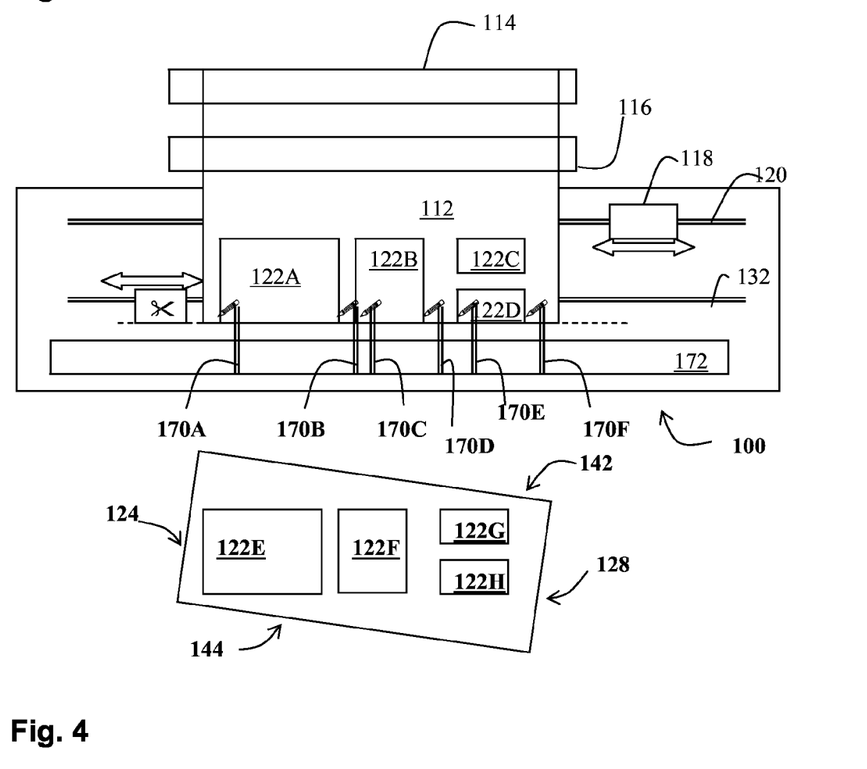
FIG. 4 is a schematic plan view of a wide format inkjet printing machine with integral widthwise cutter and lengthwise cutter(s) in accordance with another embodiment of the present invention.

With reference to FIG. 4, a schematic illustration of the printing machine 100 of FIG. 2 is shown with a number of lengthwise cutters 170A, 170B, 170C, 170D, 170E, 170F are configured to cut the medium 12 perpendicularly to the track 132 followed by the widthwise cutter 130. Preferably at least one and typically as many as six or eight lengthwise cutters 170 are provided.

The lengthwise cutters 170 are attachable to the same chassis as that carrying the widthwise cutter and printhead, and are typically coupled to a bar 172 that is parallel to the track 132 followed by the widthwise cutter 130. Although not shown, generally, the printing and cutting, at least the widthwise cutting, are controlled by a common processor.

In some embodiments, cutting may use marks that are set in the design stage and are transferred through the Raster Image Processor RIP to the printer controller, automatically defining the cut position with respect to the artwork.

With additional reference to FIG. 5, showing an annotated section of medium 134, the lengthwise cutters 170 are generally configured to section the medium 112 at settable positions across the width of the medium 112, to make cuts that are perpendicular to the cuts 142, 144 made by the widthwise cutter 130.

Each lengthwise cutter 170 may be a fixed or a rotary blade configured to cut as a knife. In this manner, it may be configured to start a cut in taut media 112 away from an edge 142, 144. In some embodiments, however, a lengthwise cutter 170 comprises a pair of blades configured as a scissors arrangement. In other embodiments, a lengthwise cutter may be configured as a guillotine blade.

The lengthwise cutters 170 may be manually positionable or automatically positionable in different positions across the width of the printing machine 100 by an automated positioning arrangement 270 (FIG. 3) controlled by the computer controller 150 and may be positioned with respect to the widthwise cuts made by the widthwise cutter 130, but will generally be positioned with respect to the edges 136, 138 of the images 122 printed. In some embodiments, such as where an irregular shaped image is printed or where test is printed on a page and margins are required, the lengthwise cutters 170 are set to follow registration marks.

In some embodiments, the processor 150 may control the depression of lengthwise cutters 170 by a computer controlled depressing mechanism 280. This may include servomotors or electromagnets for raising or lowering the lengthwise cutters 170, and in some embodiments, a counter-force, such as a spring for returning the lengthwise cutter 170 to its home position, which may be at an angle for cutting or not for cutting.

Figure 6:
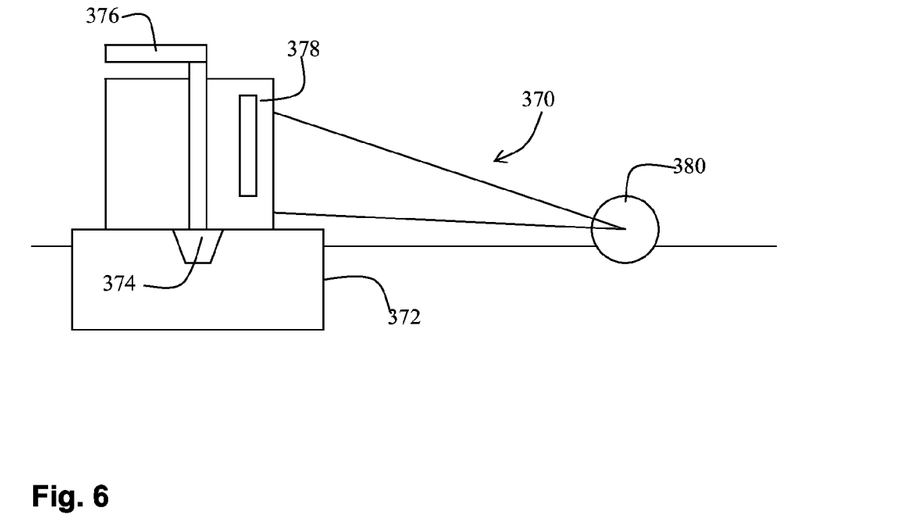
FIG. 6 is a schematic illustration of a lengthwise cutter.

FIG. 6 is a schematic illustration showing how a lengthwise cutter arm 370 may be manually locked to a bar 372 that is part of the chassis supporting a printer machine 100, using a lock nut 374 having a fixed handle 176 for manual locking. An actuator 378 is provided for lowering and raising the cutter 380. Actuator 378 may be controlled by the central processor 150.

By the combination of a widthwise cutter 130 and lengthwise cutters 170, a wide format inkjet printing machine 100 configured for printing on media 112 that is a meter or so wide, typically 3 to 5 meters and perhaps wider, may be configured to print and cut out smaller images 122 having dimensions of say, tens of centimeters, arranged in rows across the width of the media 112, where the individual images 112A-H although aligned such that their edges 136, 138, 140, 142 are parallel and perpendicular to each other, need not be aligned so that the edges 140F, 140H of adjacent images 122F, 122H may be cut in one continuous straight cut, although where possible, this may be preferable (e.g. 140E, 140F, 140G).

It will be appreciated that having a single printing and cutting machine 100 requires less space than two separate machines, one for printing 10 and a second one (not shown) for cutting, or a printer and separate manual cutting table. Thus the combined printing and cutting machine 100 described herein typically has a smaller footprint than a printer 10 and separate cutter machine downstream thereof.

Preferably the medium 112 being printed is kept taut between the printer head track 120 and the widthwise cutting track 132. The widthwise cutter 130 reciprocates along a track 132 at a fixed distance with respect to the track 120 followed by the carriage 118 carrying the print head arrangement so that the track 132 followed by the widthwise cutter 130 and the position of the widthwise cuts 146, 144, 140, 142 produced by the widthwise cutter is known with respect to the track 120 followed by the print head carriage 118, enabling the widthwise cutting to be carried out automatically by the printing machine 100.

Figure 7:
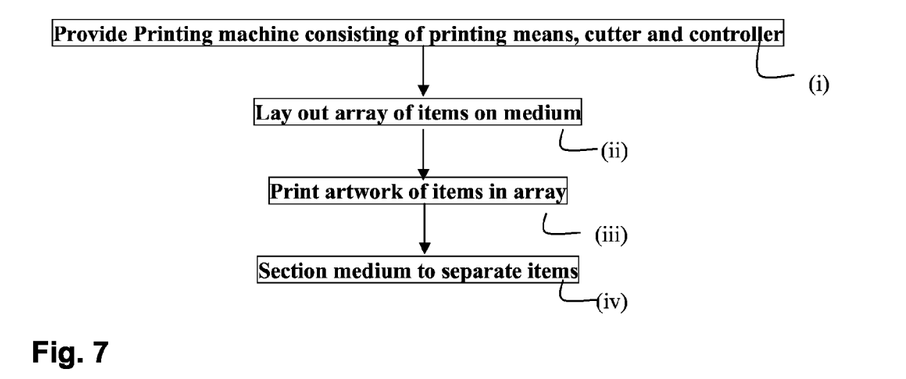
FIG. 7 is a flowchart illustrating a method of producing separate printed items, each correctly cut so that edges of the item are properly aligned with the artwork.

With respect to FIG. 7, a method of producing separate items with edges correctly aligned with the printed artwork consists of the method of providing a printing machine 100 comprising a digital printing means 118, cutters 130 and a computer controller 150, wherein the cutters 130 (170) follow a known path 132 with respect to the digital printing means 118, and providing the computer controller 150 with: (ii) a first set of instructions for planning an array of said individual items on a medium 112 in a wide format printing machine 100; (iii) a second set of instructions for printing artwork of said individual items 122A, 122B, 122C, 122D in the array across the media 112 with the digital printing means 118, and (iv) cutting said media 112 to separate said individual items with cutters 130, 170, such that edges 124, 128 of said printed items are correctly positioned with respect to the artwork 122 A-E.

Although described hereinabove with respect to wide format inkjet printers, widthwise and lengthwise cutting may be used with other printer types. Integral lengthwise and widthwise cutters mounted onto wide format inkjet printer chasses enables the wide format inkjet printer to be used for printing smaller print areas and enables these to be arranged as a mosaic over the wide media to minimize wastage.

Thus persons skilled in the art will appreciate that the present invention is not limited to what has been particularly shown and described hereinabove. Rather the scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

The invention claimed is:

1. A wide format digital printing machine for printing images onto a medium between 0.25 and 5 meters wide, the digital printing machine comprising a chassis, a digital print means comprising a plurality of ink jet heads for printing a plurality of colored inks, such that said plurality of ink jet heads are positioned within a common carriage that is configured to have reciprocate movement along a first track positioned widthwise over the medium, and an advancing mechanism for advancing the medium and controlling tautness of the medium for multiple lengths of medium for different images; the digital printing machine further comprising a widthwise cutter coupled to the chassis in parallel to said first track, the digital printing machine further comprising a common controller programmed to control the digital print means and the widthwise cutter in simultaneous and nonsimultaneous operation thereby ensuring that the cutting of the cutter is in registration with images printed by said digital print means for different lengths of a common medium on which different images are printed.

2. The digital printing machine of claim 1, wherein the inkjet printer head is configured to scan across the medium along a track and the widthwise cutter is configured to scan across the medium along a path at a fixed, known distance in front of the track followed by the digital print means.

3. The digital printing machine of claim 1 wherein said print means and said widthwise cutter are computer controlled by said computer controller, such that said cutter is automatically configurable to cut across the medium at a predetermined distance from an edge of an image.

4. The digital printing machine of claim 3 wherein said widthwise cutter is selectively configurable to cut through said medium to either (a) leave a preset margin around the printed area, (b) to follow the edge of the printed area, or (c) to remove bleed at edge of printed area.

5. The digital printing machine of claim 3 wherein said widthwise cutter is selectively configurable to make partial cuts from at least one edge, to enable separation of specific artwork images from the media.

6. The digital printing machine of claim 3 wherein said widthwise cutter is selectively configurable to make partial cuts from either edge of the media, to cut across only part of the width of the media.

7. The digital printing machine of claim 1, wherein the common computer controller uses marks that are set in the design stage and are transferred through the Raster Image Processor RIP to automatically define cut positions with respect to the artwork.

8. The digital printing machine of claim 1, wherein the common computer controller is configured to define collating preferences.

9. The digital printing machine of claim 1, wherein the common computer controller is configured to notify the user when a certain job is ready for collection.

10. The digital printing machine of claim 1, wherein the common computer controller is configured to notify the user to switch collating trays for different size jobs or different customers.

11. The digital printing machine of claim 1, wherein the common computer controller automatically switches collating trays for different size jobs or different customers.

12. The digital printing machine of claim 1 wherein said widthwise cutter comprises a cutting tool selected from the group comprising a rotary blade a fixed knife blade, a pair of blades configured as a scissors arrangement, a guillotine blade and a laser.

13. The digital printing machine of claim 1 wherein said cutter comprises two cutting tools mounted on a common track, one of said two cutting tools configured to cut as cutter is moved from left to right and the other of said two cutting tools configured to cut as cutter is moved from right to left.

14. The digital printing machine of claim 1 further comprising at least one lengthwise cutter configured to cut the medium perpendicularly to the track followed by the width cutter.

15. The digital printing machine of claim 14 wherein said at least one lengthwise cutter is selected from the group comprising a rotary blade, a knife blade and a pair of blades configured as a scissors arrangement, a guillotine blade and laser.

16. The digital printing machine of claim 14 wherein said at least one lengthwise cutter is set to follow registration marks.

17. The digital printing machine of claim 14 wherein said at least one lengthwise cutter is manually positionable.

18. The digital printing machine of claim 14 wherein said at least one lengthwise cutter is positionable by an automated positioning arrangement controlled by the computer controller.

19. The digital printing machine of claim 1 being a wide-format inkjet printing machine wherein said carriage reciprocates over a distance of at least three meters.

20. The digital printing machine of claim 1 being a wide-format inkjet printing machine wherein said carriage reciprocates over a distance of at least five meters.

21. The digital printing machine of claim 1 having a smaller footprint than a printer and separate cutter unit downstream thereof.

22. The digital printing machine of claim 1 wherein said medium is kept taut between said printer head track and said widthwise cutter track.

23. The digital printing machine of claim 1 wherein said widthwise cutter reciprocates along a track at a fixed distance with respect to the track followed by the digital print means.

24. The digital printing machine of claim 1 wherein at least one cutter coupled to the chassis may be manipulated or the medium may be advanced during reciprocation of cutter along widthwise track to make cuts that are not parallel to and not at a fixed known distance from the track.

25. A method of producing individual separate printed items of variable lengths comprising the steps of:
   (a) providing a wide format digital printing machine for printing onto a medium between 0.25 and 5 meters wide, the digital printing machine comprising a chassis, a digital print means comprising a plurality of ink jet heads for printing a plurality of colored inks, such that said plurality of ink jet heads are positioned within a common carriage that is configured to have reciprocate movement along a first track positioned widthwise over the medium, and an advancing mechanism for advancing the medium and controlling tautness of the medium for multiple lengths of medium for different images; the digital print machine further comprising a widthwise cutter coupled to the chassis in parallel to said first track, the digital printing machine further comprising a common controller programmed to control , the digital print means and the widthwise cutter in simultaneous and nonsimultaneous operation thereby ensuring that the cutting of the cutter is in registration with images printed by said digital print means for different lengths of a common medium on which different images are printed;
   (b) planning an array of said individual items on the medium in the wide-format printing machine;
   (c) printing artwork of said individual items in the array across the media with the digital printing means; and
   (d) cutting said media widthwise with cutters when at least one of the print head is printing and operation of the printing machine is between printing scans, to separate said individual items, wherein said cutters are in parallel alignment with said digital printing means and both the cutters and the digital printing means are controlled by the same computer controller so edges of cut sections of said common media are correctly aligned with the artwork corresponding to respective cut sections of said common media.

26. A method of producing individual separate printed items of variable lengths comprising:
  (a) providing a wide format digital printing machine for printing onto a medium between 0.25 and 5 meters wide, the digital printing machine comprising a chassis, a digital print means comprising a plurality of ink jet heads for printing a plurality of colored inks, such that said plurality of ink jet heads are positioned within a common carriage that is configured to have reciprocate movement along a first track positioned widthwise over the medium, and an advancing mechanism for advancing the medium and controlling tautness of the medium for multiple lengths of medium for different images; the digital print machine further comprising a widthwise cutter coupled to the chassis in parallel to said first track, the digital printing machine further comprising a common controller programmed to control, the digital print means and the widthwise cutter in simultaneous and nonsimultaneous operation thereby ensuring that the cutting of the cutter is in registration with images printed by said digital print means for different lengths of a common medium on which different images are printed, and providing the computer controller with:
  (b) a first set of instructions for planning an array of said individual items on a medium in a wide-format printing machine;
  (c) a second set of instructions for printing artwork of said individual items in the array across the media with the digital printing means, and
  (d) cutting said media to separate said individual items with cutters, when at least one of the print head is printing and operation of the printing machine is between scans such that edges of the cut printed media are correctly positioned in parallel with respect to the printed artwork.

* * * * *